United States Patent [19]

Bryant

[11] Patent Number: 5,259,821
[45] Date of Patent: Nov. 9, 1993

[54] LINEAR SPACING DEVICE

[75] Inventor: Charles B. Bryant, Hartland, Wis.

[73] Assignee: Bryant Products, Inc., Oconomowoc, Wis.

[21] Appl. No.: 815,139

[22] Filed: Dec. 27, 1991

[51] Int. Cl.$^5$ .............................. F16H 7/12; F16H 7/10
[52] U.S. Cl. ...................................... 474/136; 474/901; 52/118; 56/11.6; 403/108; 403/109; 403/378
[58] Field of Search ............... 474/100, 113, 101, 136, 474/199, 901; 403/108, 109, 378, 407.1; 414/475, 477; 56/11.6; 52/118

[56] References Cited

U.S. PATENT DOCUMENTS

| | | | |
|---|---|---|---|
| 3,495,796 | 2/1970 | Fruh | 403/108 X |
| 3,832,910 | 9/1974 | Bryant | 74/242.14 R |
| 3,949,805 | 4/1976 | Hazelett et al. | 74/242.14 R X |
| 4,792,168 | 12/1988 | Kardosh | 403/108 X |
| 4,803,804 | 2/1989 | Bryant | 474/113 |
| 5,030,173 | 7/1991 | Bryant | 474/136 |
| 5,054,608 | 10/1991 | Bryant | 198/816 |

FOREIGN PATENT DOCUMENTS 909527  5/1946  France ............................. 403/108

*Primary Examiner*—Ramon S. Britts
*Assistant Examiner*—Roger J. Schoeppel
*Attorney, Agent, or Firm*—Ryan, Kees & Hohenfeldt

[57] ABSTRACT

A linear spacing device has first and second elongated components, which may be telescoping hollow tubes, each having linear surfaces engaging each other in sliding relationship. Each component has spaced holes disposed at regular linear intervals along its length. The intervals between the holes through the second component are different than the intervals between the holes through said first component. A pin or similar means is insertable through selected aligned holes through the first and second components to secure them in a selected orientation. Thus the overall length of the spacer can be adjusted in small increments substantially less than the diameter of the holes. The device further includes an extendable linear actuator engageable with a surface of each of the components to extend the overall length of the spacer. The actuator is removable from the device after the components are secured together.

5 Claims, 3 Drawing Sheets

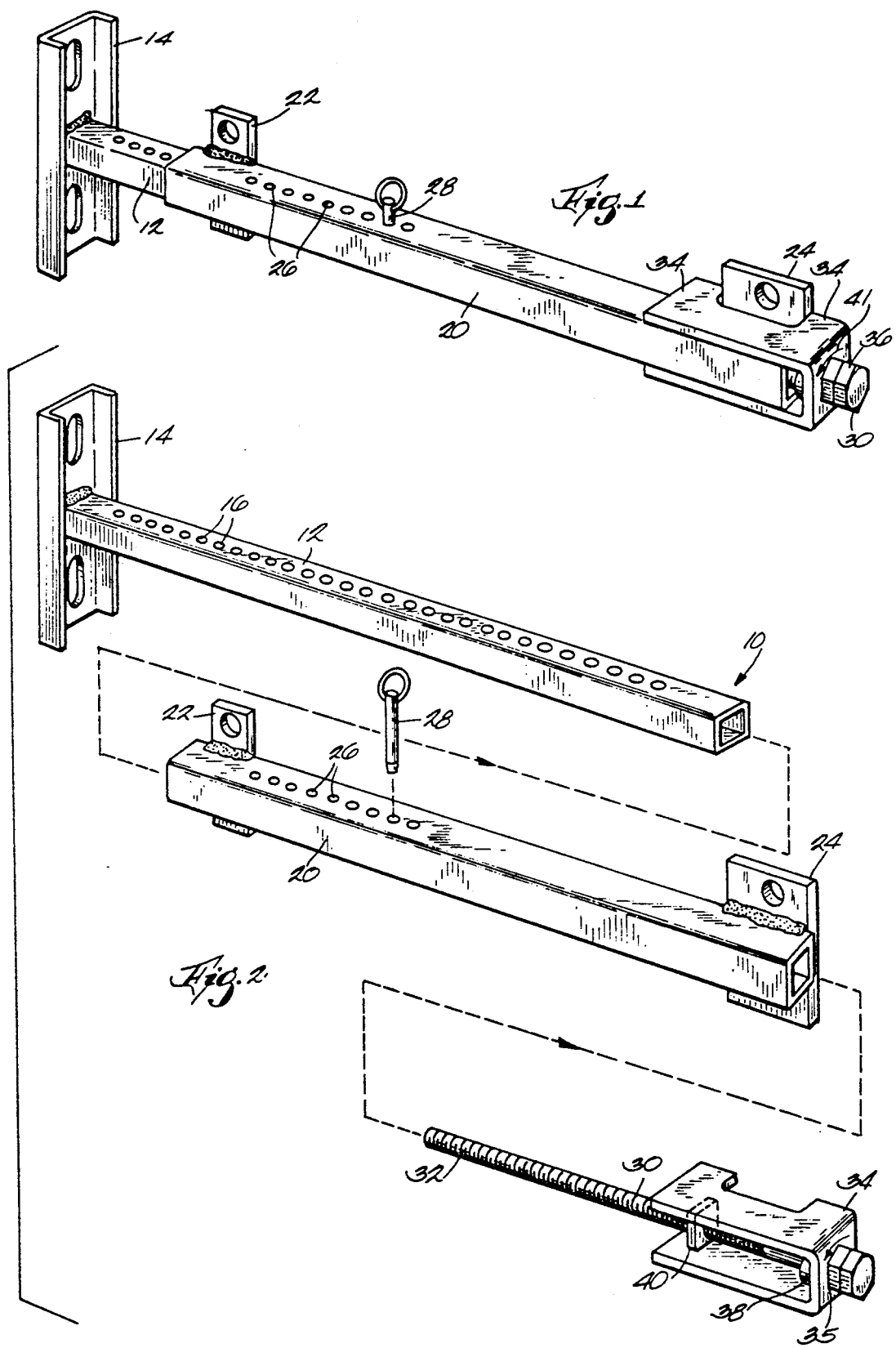

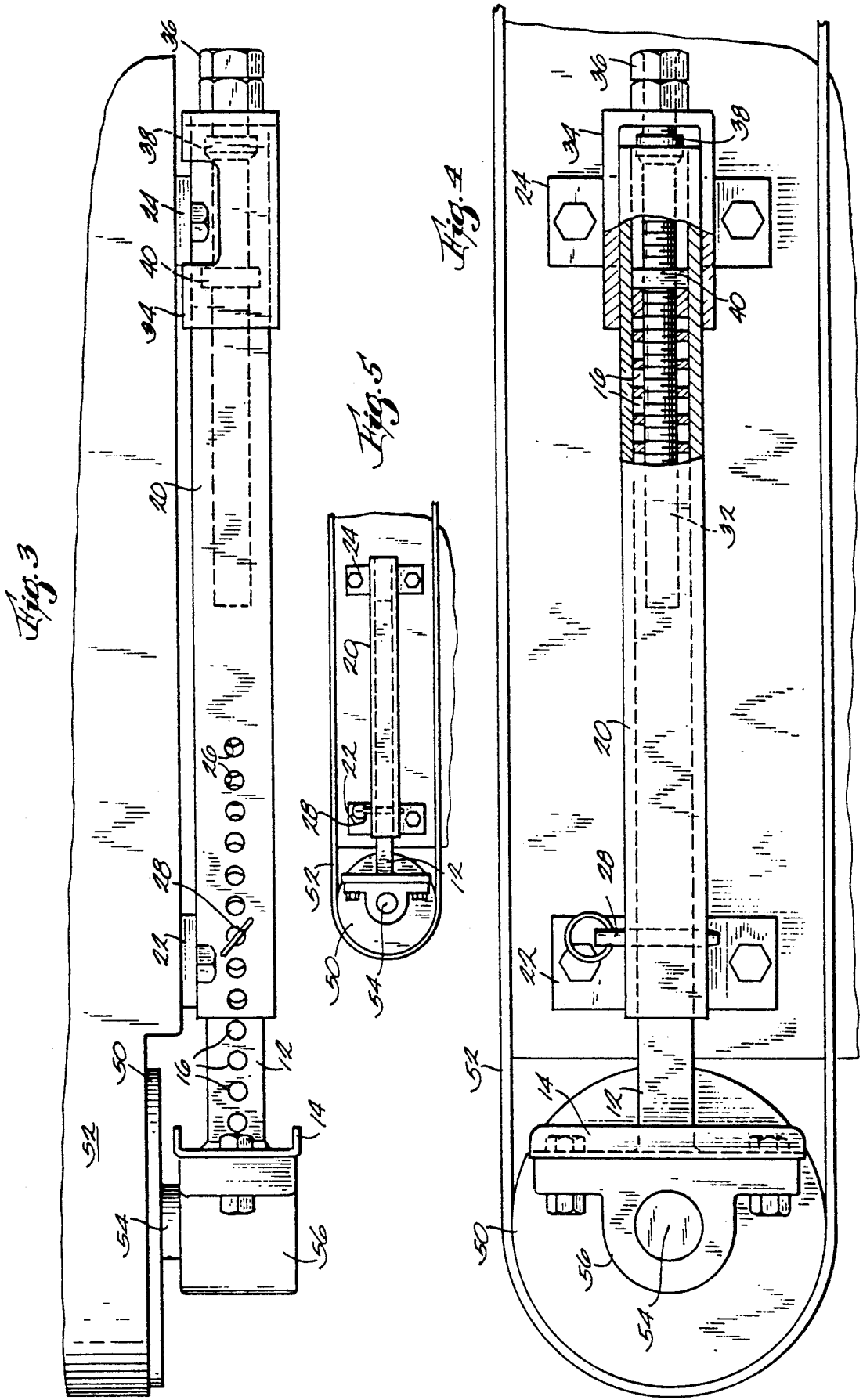

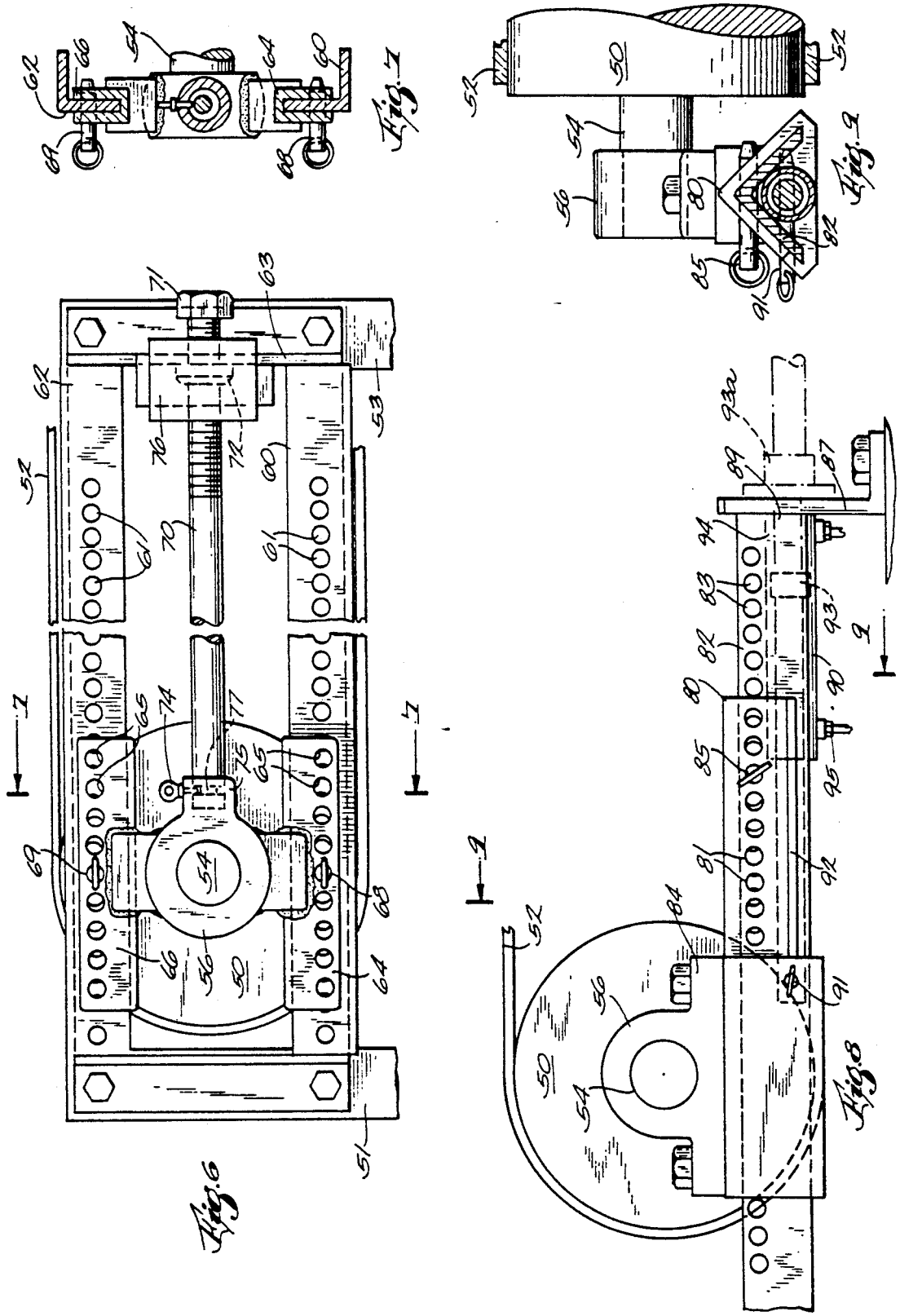

LINEAR SPACING DEVICE

FIELD OF THE INVENTION

The invention relates to linear spacing devices and also to such devices which include a removable linear actuator.

BACKGROUND OF THE INVENTION

In my previous patents, U.S. Pat. Nos. 3,832,910; 4,803,804; and 5,030,173, I have divulged various forms of telescopic tube take-up devices. These devices can be utilized for linear spacers in such applications as conveyor belt take-ups or other spacing applications in mechanical devices where adjustment of the spacing between two surfaces is necessary. While the spacing devices heretofore available have been satisfactory for general purpose applications, special problems have been found to exist in such applications as conveyors used in the food processing industry. In such applications, due to problems with achieving proper sterilization and maintenance of a suitably clean environment, it is not desirable to have such devices as threaded rod adjusters in the food processing environment. Due to the configurations of the parts involved, the surfaces are difficult to adequately clean and they provide environments that promote an unacceptable growth of bacteria, fungi and other microorganisms.

SUMMARY OF THE INVENTION

The present invention provides a linear spacing device in which the linear actuator such as a screw jack or similar threaded take-up device or a hydraulically actuated device can be removed after adjusting the spacing of the components. An important aspect of the invention is the providing of two components, slidable or extendable relative to each other in which each component contains a plurality of spaced holes disposed at regular linear intervals along the length thereof The set of holes on each of the components is spaced on differing centers so that linear extensions of the components in small increments relative to each other can be achieved, which increments are substantially less than the distance between centers of the holes of either set. The increments are also significantly smaller than the diameters of the holes, and thus relatively large pins can be inserted in the holes that come into alignment thus providing strength to the linear spacer. In accordance with this aspect of the invention, as the components are moved relative to each other in small increments, there are sets of holes through each of the two components which come into alignment so that by placing a pin through the aligned holes the components can be locked into different positions of linear extension in small increments. In the preferred embodiments each of the components in the form of a complex shape such as a square tube, i.e., two telescoping tubes, so that the hole in each relatively movable component extends entirely through the shape. In the case of telescoping tubes, the holes extend through both sides of each tube.

In another aspect of the invention a linear spacing device such as a belt take-up can be provided which utilizes a screw jack that is temporarily installed on the spacing device and removed therefrom after the spacing device is fixed or pinned in the desired orientation. In a further aspect of the invention, various linear actuators can be utilized, for example, of a worm-gear driven or hydraulically actuated type which can also be removed from the spacing device after it has been fixed or pinned at the desired degree of linear extension. A still further aspect of the invention relates to the fact that the principles thereof are applicable to a variety of differing configurations of linear spacing devices.

An important aspect of the invention is the provision of a linear spacing device for use in various sanitary environments such as food processing plants which greatly reduces the surfaces available on which contamination can occur. A further aspect involves the provision of spacing devices in which a plurality of spacing devices can be used in conjunction with only a single linear actuator, which, after use in conjunction with one spacer, can be removed and used to extend the other spacers, as desired. Thus a significant reduction in the cost of the actuators is realized.

DRAWINGS

Further aspects and advantages of the invention will become apparent from the following detailed description and accompanying drawings wherein:

FIG. 1 is a perspective view of an embodiment of a linear spacing device of this invention;

FIG. 2 is a perspective view with parts disassembled of the device of FIG. 1 and also including a threaded type linear actuator used in conjunction therewith;

FIG. 3 is a top view of a linear spacing device of the type shown in FIG. 1 shown in conjunction with a pulley for a conveyor belt;

FIG. 4 is a side elevational view of the linear spacer and actuator of FIG. 3;

FIG. 5 is a side elevational view of the device of FIG. 4 with the linear actuator removed;

FIG. 6 is a side elevational view illustrating a different embodiment of the invention in conjunction with a conveyor belt;

FIG. 7 is a cross-sectional view of the device of FIG. 6 taken along line 7—7;

FIG. 8 is a side elevational view showing yet another embodiment of the invention with an alternate location of a linear actuator shown by broken lines;

FIG. 9 is a cross-sectional view of the device of FIG. 8 taken along line 9—9; and,

DETAILED DESCRIPTION

A linear spacing device 10 of this invention includes a first elongated component 12, which in the case of the embodiment of FIGS. 1-5 takes the shape of a hollow elongated tube of rectangular, preferably square cross-section attached at one end to a bracket 14. Hollow tube 12 is provided with a series of spaced holes extending entirely through the tube and disposed at regular linear intervals along a substantial portion of the length thereof. A telescoping square hollow tube 20 is provided with brackets 22 and 24 and has a second set of holes 26 spaced along the length thereof. A pin 28 is provided to secure components 12 and 20 together at a desired degree of extension. Since holes 26 have a different spacing than holes 16, a means is provided whereby the degree of extension of the tubes 12 and 20 relative to each other can be adjusted in small increments which are substantially smaller than the diameter of the individual holes. This capability is provided by virtue of the fact that a different set of holes 16 will align with various holes 26 as the parts are telescoped relative to each other.

In the embodiment of FIGS. 1-5 a linear actuator is provided in the form of a rod 30 which is provided with threads 32 and is contained within a bracket 34. Bracket 34 contains a central hole 35 for passage of rod 30. Rod 30 can be rotated by means of a wrench engaging head 36, and a washer 38 welded integrally with rod 30 retains rod 30 within an a fixed longitudinal position within bracket 34. A square threaded nut 40 adapted to fit within the larger telescoping tube 20, but is too large to fit within tube 12 abuts against the end of tube 12. Nut 40 is moved by rotation of threaded rod 30 and is thus utilized to cause tube 12 to telescope with respect to tube 20. Bracket 34 engages bracket 24 so that relative force can be applied between telescoping components 12 and 20 as head 36 is rotated by means of a wrench.

The telescoping components 12 and 20 are extended relative to each other by means of rotation of head 36 until the desired degree of spacing between tube 20 and bracket 14 is achieved. At that position a pair of holes 16 and 26 extending through both of the telescoping tubes are visually located which are in alignment and pin 28 inserted therethrough. After the telescoping components 12 and 20 are pinned together, the linear actuator 29 can be removed therefrom.

In order to remove or readjust the linear spacer of this invention the linear actuator is reattached to the spacer. The linear actuator can be then extended very gradually against the tension of the belt while exerting removal force against the pin 28. An arrow 41 can be marked on the spacer to indicate the direction for removal. In some cases the actuator can be gently oscillated while exerting removal force on the pin so as to avoid shearing of the pin. In a further aspect of the invention, a pin can be provided with means (such as a change of color or and audible sound) to indicate that the pressure thereon has been relieved thus indicating that the pin is loose and can be removed.

As seen in FIGS. 3-5, bracket 14 can be attached to a bearing 56 within which a shaft 54 carrying a roller 50 is journaled. Roller 50 provides a path of travel for a belt 52. Brackets 22 and 24, which may be the same or different sizes, are secured to the framework of the device on which belt 52 is mounted. As seen in FIG. 3, the belt 52 can be tightened by turning bolt head 36 to cause tube 12 to be extended from within tube 20. As also seen in FIG. 3, many of the pairs of holes 16 and 26 are out of alignment with each other but a pair of such holes is located through which pin 28 can be inserted. After pin 28 is inserted as shown, the linear actuator 29 is removed to leave the telescoped components pinned together as shown in FIG. 5 with belt 52 tightened as desired. It will be noted that if the belt 52 as seen in FIG. 5 is located within a food processing plant, the amount of threaded surfaces on which debris can accumulate and microorganisms form is greatly reduced after removal of the linear actuator.

In the embodiments of FIGS. 6, 7 and 10 a pair of flat surfaces 60 and 62 is provided by use of surfaces of angle bars, as seen in FIG. 7. Each of the opposed flat surfaces is provided with a series of spaced holes 61. End brackets 63 and 63a which support the opposite ends of the angle bars are affixed to the conveyor sidewall 51, 53. A pair of U-shaped brackets 64 and 66 is provided in sliding relationship with flat surfaces 60 and 62. Brackets 64 and 66 have a series of holes 65 provided along the length thereof at a different spacing than the spacing between holes 61. Roller 50 is provided to form a travel path for belt 52 in similar fashion to the roller and belt of FIGS. 1-5. Shaft 54 which forms an axis of rotation for roller 50 is journaled in bearing 56 which in turn is carried on brackets 64 and 66. Threaded rod 70 is provided to linearly move bearing 56 to which it is connected by means of a pin 74 which passes through a hole in a socket 75 that is attached to a side of bearing 56. Pin 74 retains rod 70 by engaging a groove 77 adjacent the end of rod 70. Collar 72 is threaded on rod 70. The position of brackets 64 and 65 relative to flange 63 is controlled by rotation of bolt head 71. In this case, collar 72 is welded to bracket 76 so that the rotation of threaded shaft 70 within threaded collar 72 causes linear motion of brackets 64 and 66 along the flat surfaces of angle bars 60 and 62. A lip portion of bracket 76 and collar 72 engage opposite sides of flange 63 to position the threaded linear actuator 70 longitudinally relative to bearing 56. As in the case of the first described embodiment, the linearly extendable components are pinned to each other by means of pins 68 and 69. The linear actuator is removed by removal of pin 74 and removal of bracket 76 off of flange 63.

In the further embodiment of FIGS. 8 and 9, the surfaces 80 and 82 are extendable relative to each other to tighten belt 52. In this case, surfaces 80 and 82 take the form of nested angle irons. Angle iron 80 has a series of holes 81 along the length thereof. The surface of angle iron 82 with which it is nested is also provided with a series of linearly spaced holes 83 along the length thereof at a different spacing than holes 81. In this embodiment a linear actuator 90 of a hydraulically actuated type is shown. The rod end 92 of the actuator 90 is secured to a bracket 84 integral with angle iron 80 by means of a pin 91. Bracket 84 is secured to a bearing 56 in which shaft 54 is journaled, carrying thereon rotatably cylinder 50 on which belt 52 travels. The opposite end 89 of actuator 90 bears against bracket 87, which is integral with angle iron 82. Actuator 90 includes a piston 93 that is caused to travel within cylinder 94 by means of hydraulic pressure controlled through fluid ports 95 and 96. As in the case of the earlier-described embodiments of the invention, after linear actuator 90 is extended to apply the appropriate amount of tension on belt 52, a pair of holes 81 and 83 is located through which a pin 85 can be inserted. This locks the slidable components in position such that the spacing between bracket 87 and bracket 56 is such that the optimum amount of tension is applied to belt 52 Thereafter, linear actuator 90 is removed from the linear spacing device. Actuator 93 can alternatively be located outside of bracket 87 as indicated at 93a, particularly if space presents a problem.

It should be noted that while specific types of linear actuators have been shown in use with various specific embodiments of the linear spacing devices of this invention, the type of actuator used with a particular embodiment of spacer is a matter of choice. Thus, if desired, a hydraulically actuated linear actuator or worm gear type or crank driver actuator could be used, for example, in connection with the spacer shown in FIG. 1-5.

EXAMPLE

In a specific design of a linear spacer of the invention configured as shown in FIGS. 1-5 the following dimensions were used:
pin diameter: 5/16 INCH
hole diameter on both sliding components: 21/64 INCH
nine holes in body tube: 17/32 IN., center to center
ten holes in slider tube: 15/32 IN. center to center.

In this case the 17/32" space between body holes can be adjusted in 9 equal steps, each step being 1/9th of the 17/32 space between body holes, i.e., 0.059 ". Thus, the multi-hole spacing arrangement provides the capability to adjust the spacing 9 times finer than the fineness of adjustment achieved if the hole spacing were the same on both tubes.

What is claimed is:

1. A linear spacing device for adjusting the distance between a point on a first surface and a point on a second surface, comprising:
   a first component having an elongated linear intermediate surface disposed between first and second ends;
   a second component having an elongated linear intermediate surface disposed in slidable contact with the intermediate surface of said first component and disposed between said first and second ends,
   means for attaching the first end of the first component to the first surface;
   means for attaching the second component to the second surface;
   a detachable linear actuator engaging a point on each of the first and second components, whereby the first and second components can be telescoped by extension and retraction of said linear actuator to cause sliding of said elongated linear intermediate surfaces relative to each other, said actuator being removable from said device after said components are secured together in an extended orientation;
   means for releasably securing the first and second components to each other comprising a plurality of spaced holes through said intermediate surface of said first component disposed at regular intervals along the length thereof;
   a plurality of spaced holes through said intermediate surface of said second component disposed at regular intervals along the length thereof and individually alignable with the holes through said first component as said surfaces are moved linearly relative to each other, the intervals between the holes through said first component being different than the intervals between said holes through said second component, and,
   a pin insertable through selected aligned holes through said first and second components to secure said tubes in a selected orientation relative to each other, so that the linear actuator can be removed leaving said components in said orientation with said first and second surfaces spaced apart a selected distance.

2. A device according to claim 1 wherein said linear actuator comprises a threaded means having one threaded element engaging said first component and a second mating threaded element engaging said second component.

3. A belt tensioning device comprising:
   a first component having an elongated linear intermediate surface disposed between first and second ends;
   a second component having an elongated linear intermediate surface disposed in slidable contact with the intermediate surface of said first component and disposed between first and second ends,
   means for attaching the first component to a stationary surface;
   means for attaching the second component to a movable second surface which carries a bearing for a roller or pulley over which a belt is reeved;
   detachable threaded means engaging a point on the first component, and a mating threaded element for engaging said second component whereby the first and second components can be telescoped by sliding said elongated linear intermediate surfaces relative to each other,
   means for releasably securing the first and second components to each other comprising a plurality of spaced holes through said intermediate surface of said first component disposed at regular intervals along the length thereof;
   a plurality of spaced holes through said intermediate surface of said second component disposed at regular intervals along the length thereof and individually alignable with the holes through said first component as said surfaces are moved linearly relative to each other, the intervals between the holes through said first component being different than the intervals between said holes through said second component, and,
   a means insertable through selected aligned holes through said first and second components to secure said tubes in a selected orientation relative to each other, so that the threaded means can be removed leaving said components in said orientation.

4. A device for adjusting the distance between a point on a first surface and a point on a second surface, comprising:
   an outer tube having first and second ends;
   an inner tube having first and second ends, the first end being slidably received within the first end of the outer tube;
   means for attaching the second end of the outer tube to the first surface;
   means for attaching the second end of the inner tube to the second surface;
   detachable threaded means insertable into the first end of the outer tube, said threaded means having a surface connected to a threaded element for engaging said second end of said outer tube and a mating threaded element for engaging the first end of the inner tube whereby the inner and outer tubes can be telescoped, and,
   means for releasably securing the inner and outer tubes to each other at a selected telescoped orientation, so that the threaded means can be removed leaving the tubes in said telescoped orientation.

5. A device according to claim 4 wherein the means for releasably securing said tube comprises a plurality of spaced holes through said outer tube disposed at regular intervals along the length thereof;
   a plurality of spaced holes through said inner tube disposed at regular intervals along the length of said inner tube, the intervals between the holes through said inner tube being different than the intervals between said holes through said outer tube, and,
   a means insertable through selected aligned holes through said inner and outer tubes to secure said tubes in the selected orientation.

* * * * *